(12) United States Patent
Xiao et al.

(10) Patent No.: US 10,840,497 B2
(45) Date of Patent: Nov. 17, 2020

(54) BATTERY MODULE AND METHOD FOR CONTROLLING CHARGE AND DISCHARGE

(71) Applicant: GUANGZHOU XAIRCRAFT TECHNOLOGY CO., LTD., Guangzhou (CN)

(72) Inventors: Dingfeng Xiao, Guangzhou (CN); Haijun Wen, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 164 days.

(21) Appl. No.: 15/774,506

(22) PCT Filed: Nov. 24, 2017

(86) PCT No.: PCT/CN2017/112824
§ 371 (c)(1),
(2) Date: May 8, 2018

(87) PCT Pub. No.: WO2018/099327
PCT Pub. Date: Jun. 7, 2018

(65) Prior Publication Data
US 2019/0097205 A1    Mar. 28, 2019

(30) Foreign Application Priority Data

Dec. 2, 2016 (CN) .......................... 2016 1 1102180
Dec. 2, 2016 (CN) ...................... 2016 2 1321874 U (51) Int. Cl.
*H01M 2/34* (2006.01)
*H01M 10/613* (2014.01)
(Continued)

(52) U.S. Cl.
CPC ......... *H01M 2/348* (2013.01); *H01M 2/1077* (2013.01); *H01M 10/48* (2013.01);
(Continued)

(58) Field of Classification Search
CPC ............ H01M 10/613; H01M 10/615; H01M 10/617; H01M 10/625; H01M 10/633;
(Continued)

(56) References Cited

U.S. PATENT DOCUMENTS 9,853,334 B2 * 12/2017 Buck .................. H01M 10/655
10,525,786 B2 * 1/2020 Hirasawa .......... H01M 10/6554
(Continued)

FOREIGN PATENT DOCUMENTS

CN    201699090    1/2011
CN    102593547    7/2012
(Continued)

OTHER PUBLICATIONS

Machine translation of CN205723857 (no date).*
(Continued)

*Primary Examiner* — Amanda C. Walke
(74) *Attorney, Agent, or Firm* — Hodgson Russ LLP (57) ABSTRACT

A battery module (100) and a method for controlling charge and discharge are provided. The battery module (100) includes a battery body disposed in an outer housing, a heat conduction assembly (4) connected between the outer housing and the battery body in a heat conduction manner, a first heating member (5) for heating the battery body, a second heating member (6) for heating the heat conduction assembly (4), a temperature sensor (8) for detecting a temperature of the battery body and generating a temperature signal according to the detected temperature of the battery body, and a control assembly (7) for receiving the temperature signal and controlling the first heating member (5) and the second heating member (6) according to the temperature signal.

17 Claims, 6 Drawing Sheets

(51) Int. Cl.
  *H01M 10/623* (2014.01)
  *H02J 7/00* (2006.01)
  *H01M 10/625* (2014.01)
  *H01M 10/633* (2014.01)
  *H01M 10/48* (2006.01)
  *H01M 10/6554* (2014.01)
  *H01M 10/6552* (2014.01)
  *H01M 10/615* (2014.01)
  *H01M 10/6571* (2014.01)
  *H01M 2/10* (2006.01)
  *H01M 10/647* (2014.01)

(52) U.S. Cl.
  CPC ....... *H01M 10/613* (2015.04); *H01M 10/615* (2015.04); *H01M 10/623* (2015.04); *H01M 10/625* (2015.04); *H01M 10/633* (2015.04); *H01M 10/6552* (2015.04); *H01M 10/6554* (2015.04); *H01M 10/6571* (2015.04); *H02J 7/0042* (2013.01); *H02J 7/0091* (2013.01); *H02J 7/007192* (2020.01); *H01M 10/647* (2015.04); *H01M 2220/20* (2013.01)

(58) Field of Classification Search
  CPC ......... H01M 10/6552; H01M 10/6554; H01M 10/6571; H01M 2/384; H01M 2/1077
  See application file for complete search history.

(56) References Cited

U.S. PATENT DOCUMENTS

| | | | |
|---|---|---|---|
| 2011/0198335 | A1 | 8/2011 | Lin |
| 2013/0236753 | A1 | 9/2013 | Yue et al. |
| 2016/0072161 | A1 | 3/2016 | Nubbe |
| 2016/0204488 | A1* | 7/2016 | Arai .............. H01M 10/613 429/62 |
| 2018/0034121 | A1* | 2/2018 | Kwon ............ H01M 2/1094 |
| 2019/0036100 | A1* | 1/2019 | Wilka ............ H01G 11/82 |

FOREIGN PATENT DOCUMENTS

| | | |
|---|---|---|
| CN | 205264833 | 5/2016 |
| CN | 205723857 | 11/2016 |
| CN | 206349470 | 7/2017 |
| CN | 107768776 A * | 3/2018 |
| JP | 2014186793 | 10/2014 |
| KR | 20060027579 | 3/2006 |
| KR | 20150105045 | 9/2015 |
| WO | 2016107136 | 7/2016 |

OTHER PUBLICATIONS

Machine translation of PCT-237 (no date).*
Machine translation of CN201699090 (no date).*
IP Australia, Office Action for AU Application No. 2017359583, dated May 24, 2019.
KIPO, Office Action for KR Application No. 10-2018-7014952, dated Oct. 14, 2019.

* cited by examiner

BATTERY MODULE AND METHOD FOR CONTROLLING CHARGE AND DISCHARGE

CROSS-REFERENCE TO RELATED APPLICATIONS

The present application is a U.S. national phase application of International Application PCT/CN2017/112824, filed Nov. 24, 2017, which claims the benefit of and priority to Chinese Patent Application No. 201621321874.8 filed Dec. 2, 2016 and No. 201611102180.X filed Dec. 2, 2016, the entire disclosures of which are incorporated herein by reference.

FIELD

The present disclosure relates to a technical field of batteries, and more particularly to a battery module and a method for controlling charge and discharge.

BACKGROUND

The effects of temperature on a battery are presented in two aspects. In a low-temperature environment, such as in winter, a battery capacity is reduced, a battery temperature is too low and is not conducive to an electrochemical reaction of the battery, the chemical reaction is slower and energy is easily lost, which cannot meet the use requirements. In addition, a charge and discharge performance of the battery in the low-temperature environment is also lower than that in a normal temperature, even the battery cannot be directly charged when the battery temperature is lower than a certain value, facing the safety hazards existing in the low-temperature charge. When the environmental temperature rises, the battery capacity increases, the chemical reaction inside the battery is obviously intensified, and it is series relationship between a reaction rate and the temperature, the temperature rise will make the internal resistance of the battery smaller, thus the battery efficiency is improved. However, the higher temperature also accelerates the harmful reaction, which tends to damage an electrode and to cause overcharge, especially in the high-temperature summer, the heat production rate of the battery is greater than the heat dissipation rate, a large amount of heat is accumulated and the battery temperature rises. If the heat cannot be effectively dissipated, the capacity, service life, use stability and safety property of the battery are more significantly influenced.

Therefore, the temperature has a crucial influence on the performance of the battery, and the difference in battery temperature determines the service life, the stability and the safety property of the battery. In the power battery module in the related art, regardless of the high-temperature environment or the low-temperature environment, the heat dissipation device dissipates heat for the power battery, the power battery has a complex heat dissipation structure and unsatisfactory heat dissipation efficiency, resulting in an increase in the cost of the battery module and that the service life, the use stability and the safety property cannot be guaranteed.

SUMMARY

The present disclosure seeks to solve one of the technical problems existing in the related art to at least some extent. Accordingly, the present disclosure provides a battery module, which has a simple structure, a great heat dissipation effect, a stable performance, a long service life, a high safety property, and can preheat a battery.

The present disclosure further provides a method for controlling charge and discharge of the above-mentioned battery module.

The present disclosure further provides an unmanned aerial vehicle having the above-mentioned battery module.

The battery module according to embodiments of a first aspect of the present disclosure includes: a battery body; an outer housing, the battery body being disposed in the outer housing; a heat conduction assembly, the heat conduction assembly being connected between the outer housing and the battery body in a heat conduction manner; a first heating member, the first heating member being connected to the battery body and configured to heat the battery body; a second heating member, the second heating member being connected to the heat conduction assembly and configured to heat the heat conduction assembly; a temperature sensor, the temperature sensor being configured to detect a temperature of the battery body and generate a temperature signal according to the detected temperature of the battery body; and a control assembly, the control assembly being electrically connected to the first heating member, the second heating member and the temperature sensor separately, and being configured to receive the temperature signal and control the first heating member and the second heating member according to the temperature signal.

In the battery module according to embodiments of the present disclosure, with the first heating member provided for heating the battery body, the heat conduction assembly provided to be connected between the outer housing and the battery body in the heat conduction manner, the second heat conduction member provided for heating the heat conduction assembly, and meanwhile the temperature sensor provided for detecting the temperature of the battery body, the control assembly of the battery module can control the first heating member and the second heating member to perform heating or stop heating according to the temperature signal fed back by the temperature sensor. As a result, the first heating member and the second heating member can be controlled to perform heating at a lower environmental temperature, in which the first heating member can heat the battery body directly, and the second heating member can transfer heat to the battery body through the heat conduction assembly, so that the battery body can be preheated in the low-temperature environment to ensure that the battery module can be normally charged and discharged and the charge and discharge performance of the battery module can be improved; the first heating member and the second heating member are controlled to stop heating at a higher environmental temperature, and the heat generated by the battery body is transferred to the outer housing by means of the heat conduction assembly, so that the heat generated by the battery body can be quickly, promptly and effectively dissipated, thereby improving the service life, the use stability, and the safety property of the battery module.

In some preferred embodiments, the heat conduction assembly includes a first heat conduction member and a second heat conduction member connected with each other in the heat conduction manner, the battery body includes a side wall and an end wall connected to an end of the side wall, the first heat conduction member is connected to the side wall in the heat conduction manner, the second heat conduction member is adjacent to the end wall, and the second heat conduction member is connected with the outer housing in the heat conduction manner.

In some preferred embodiments, the heat conduction assembly further includes a heat pipe, and the heat pipe includes a first end and a second end bendably connected to the first end, the first end of the heat pipe is connected with the first heat conduction member, and the second end of the heat pipe is connected with the second heat conduction member.

In some preferred embodiments, a plurality of heat pipes is provided, the plurality of heat pipes is spaced apart, the first end of each heat pipe extends along a length direction of the first heat conduction member, and the second end of each heat pipe extends along a length direction of the second heat conduction member.

In some preferred embodiments, heating power of the first heating member is less than heating power of the second heating member.

In some preferred embodiments, a plurality of groups of the heat conduction assemblies is provided, and the plurality of groups of the heat conduction assemblies is spaced apart along a circumferential direction or a height direction of the battery body.

In some preferred embodiments, the second heating member is a heating plate or a heating film or a semi-conductive heating sheet.

In some preferred embodiments, the battery body includes an inner casing and a plurality of battery cells, the inner casing includes the end wall and the side wall, the inner casing defines therein a plurality of accommodating spaces spaced apart, and the plurality of battery cells is disposed in the plurality of accommodating spaces correspondingly.

The method for controlling charge and discharge of the above-mentioned battery module according to embodiments of a second aspect of the present disclosure includes the following blocks. S01: the control assembly receives the temperature signal sent by the temperature sensor, in which the temperature signal is generated by the temperature sensor according to the temperature of the battery body; and S02: when a temperature Tx corresponding to the temperature signal doesn't exceed a temperature T0, the control assembly controls the first heating member to heat the battery body, the control assembly controls the second heating member to heat the heat conduction assembly, in which the temperature T0 is a temperature threshold.

In the method for controlling charge and discharge of the above-mentioned battery module according to embodiments of the present disclosure, the temperature of the battery body is detected by the temperature sensor before the battery module is charged and discharged. When the detected temperature of the battery body doesn't exceed a set temperature threshold, the control assembly controls the first heating member and the second heating member to perform heating, so that the battery body can be preheated in the low-temperature environment. The method for controlling charge and discharge is simple and reliable, which can guarantee that the battery module is normally charged and discharged and can improve the charge and discharge performance of the battery module.

In some preferred embodiments, when the temperature Tx exceeds the temperature T0, the control assembly controls the first heating member not to heat the battery body, and the control assembly controls the second heating member not to heat the heat conduction assembly.

In some preferred embodiments, the temperature T0 is 15° C.-20° C.

REFERENCE NUMERALS battery module 100;
front side plate 11; rear side plate 12; left side plate 13; right side plate 14; top cover 15; first rib 16; second rib 17; rubber pad 18;
inner casing 2; first side plate 21; second side plate 22; third side plate 23; fourth side plate 24; partition plate 25; accommodating space 26;
battery cell 3;
heat conduction assembly 4, first heat conduction member 41; second heat conduction member 42; groove 421; heat pipe 43;
first heating member 5; second heating member 6;
control assembly 7;
temperature sensor 8.

DETAILED DESCRIPTION

The embodiments of the present disclosure will be described in detail below. Examples of the embodiments are illustrated in the accompanying drawings. The embodiments described below with reference to the accompanying drawings are exemplary, and are intended to explain the present disclosure, but cannot be understood as a limitation to the present disclosure.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "circumferential" should be construed to refer to the orientation as then described or as shown in the drawings under discussion. The illustrated orientation or positional relationship is merely for convenience of describing the present disclosure and simplification of the description, and does not indicate or imply that the indicated device or element must have a particular orientation, be constructed and operated in a specific orientation, therefore cannot be understood as a limitation to the present disclosure.

In addition, the terms "first" and "second" are only used for descriptive purposes and cannot be understood to indicate or imply relative importance or implicitly indicate the number of indicated technical features. Thus, the features defined with "first" and "second" may explicitly or implicitly include one or more of this feature. In the descriptions of the present disclosure, "a plurality of" means at least two, such as two or three, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communicable with each other; may also be direct connections or indirect connections via intervening structures; may also be inner communications or interacting relationship of two elements, unless specified otherwise, which can be understood by those skilled in the art according to specific situations.

A battery module 100 according to an embodiment of the present disclosure will be described below with reference to FIGS. 1-7.

As illustrated in FIGS. 1 to 7, the battery module 100 according to embodiments of the present disclosure includes a battery body, an outer housing, a heat conduction assembly 4, a first heating member 5, a second heating member 6, a temperature sensor 8, and a control assembly 7.

Specifically, the battery body is disposed in the outer housing, and the heat conduction assembly 4 is connected between the outer housing and the battery body in a heat conduction manner and can transfer heat. For example, the heat conduction assembly 4 can transfer heat in the battery body to the outer housing, and the heat conduction assembly 4 can also transfer heat to the battery body.

The first heating member 5 is used for heating the battery body, and the first heating member 5 can be disposed to the battery body. When the first heating member 5 operates, the first heating member 5 can directly heat the battery body.

The second heating member 6 is used for heating the heat conduction assembly 4, and the second heating member 6 can be disposed to the heat conduction assembly 4. When the second heating member 6 operates, the second heating member 6 can heat the heat conduction assembly 4. Since the heat conduction assembly 4 is connected between the outer housing and the battery body in the heat conduction manner, the heat conduction assembly 4 can transfer heat to the battery body.

The temperature sensor 8 is used for detecting a temperature of the battery body and for generating a temperature signal according to the detected temperature of the battery body. The temperature sensor 8 can be disposed to the battery body.

The control assembly 7 is electrically connected to the first heating member 5, the second heating member 6 and the temperature sensor 8 separately. The control assembly 7 is used for receiving the temperature signal and for controlling the first heating member 5 and the second heating member 6 according to the temperature signal. That is, the control assembly 7 can control the first heating member 5 and the second heating member 6 to perform heating or to stop heating according to the temperature signal generated by the temperature sensor 8 according to the detected temperature of the battery body.

Heating power of the first heating member 5 can be less than heating power of the second heating member 6. Thus, when the control assembly 7 controls the first heating member 5 and the second heating member 6 to perform heating, it can be guaranteed that a temperature of the heat conduction assembly 4 heated by the second heating member 6 is higher than a temperature of the battery body heated by the first heating member 5, so that it can be guaranteed that the heat conduction member 4 can transfer heat to the battery body, preventing the heat of the battery body from being transferred to the outer housing to be radiated out caused by the temperature of the heat conduction assembly 4 being lower than that of the battery body, and avoiding energy waste.

For example, in a high-temperature environment (e.g., in summer), during the operation of the battery module 100, the battery body generates a large amount of heat, and the temperature sensor 8 detects a higher temperature of the battery body, and the temperature sensor 8 transmits the temperature signal to the control assembly 7, and the control assembly 7 controls the first heating member 5 and the second heating member 6 not to operate. The heat conduction assembly 4 can transfer the heat of the battery body to the outer housing, and eventually the heat is dissipated to the outside environment through the outer housing, so that the heat generated by the battery body can be dissipated to the outside environment efficiently and timely, thereby the service life, the use stability and the safety property of the battery module 100 can be improved.

For another example, in a low-temperature environment (e. g., in winter), the temperature of the battery body is lower, which is not conducive to the chemical reaction of the battery body, or even the battery body cannot be charged and discharged directly. The temperature sensor 8 detects a lower temperature of the battery body, the temperature sensor 8 transmits the temperature signal to the control assembly 7, and the control assembly 7 controls the first heating member 5 and the second heating member 6 to operate. The first heating member 5 can directly heat the battery body, so that the temperature of the battery body can be rapidly increased, meanwhile the second heating member 6 heats the heat conduction assembly 4, and the heat conduction assembly 4 can transfer heat to the battery body, whereby the battery body can be heated rapidly and evenly by the first heating member 5 and the second heating member 6 provided. When the temperature of the battery body reaches a set temperature value, the battery module 100 can be charged and discharged, and meanwhile the control assembly 7 can control the first heating member 5 and the second heating member 6 to stop heating, so that the battery body can be rapidly preheated in the low-temperature environment, ensuring the battery module 100 to be charged and discharged normally and improving the charge and discharge performance of the battery module 100.

In the battery module 100 according to embodiments of the present disclosure, with the first heating member 5 provided for heating the battery body, the heat conduction assembly 4 provided to be connected between the outer housing and the battery body in the heat conduction manner, the second heat conduction member 42 provided for heating the heat conduction assembly 4, and meanwhile the temperature sensor 8 provided for detecting the temperature of the battery body, the control assembly 7 of the battery module 100 can control the first heating member 5 and the second heating member 6 to perform heating or to stop heating according to the temperature signal fed back by the temperature sensor 8. As a result, the first heating member 5 and the second heating member 6 can be controlled to perform heating at the lower environmental temperature, in which the first heating member 5 can heat the battery body directly, and the second heating member 6 can transfer heat to the battery body through the heat conduction assembly 4, so that the battery body can be preheated in the low-temperature environment to ensure that the battery module 100 can be normally charged and discharged and the charge and discharge performance of the battery module 100 can be improved; the first heating member 5 and the second heating member 6 are controlled to stop heating at the higher environmental temperature, and the heat generated by the battery body is transferred to the outer housing by means of the heat conduction assembly 4, so that the heat generated by the battery body can be quickly, promptly and effectively dissipated, thereby improving the service life, the use stability, and the safety property of the battery module 100.

The battery module 100 according to an embodiment of the present disclosure will be described in detail with reference to FIGS. 1 to 7.

Referring to FIGS. 1-7, the battery module 100 includes the battery body, the outer housing, the heat conduction assembly 4, the first heating member 5, the second heating member 6, the temperature sensor 8, and the control assembly 7.

Figure 1:
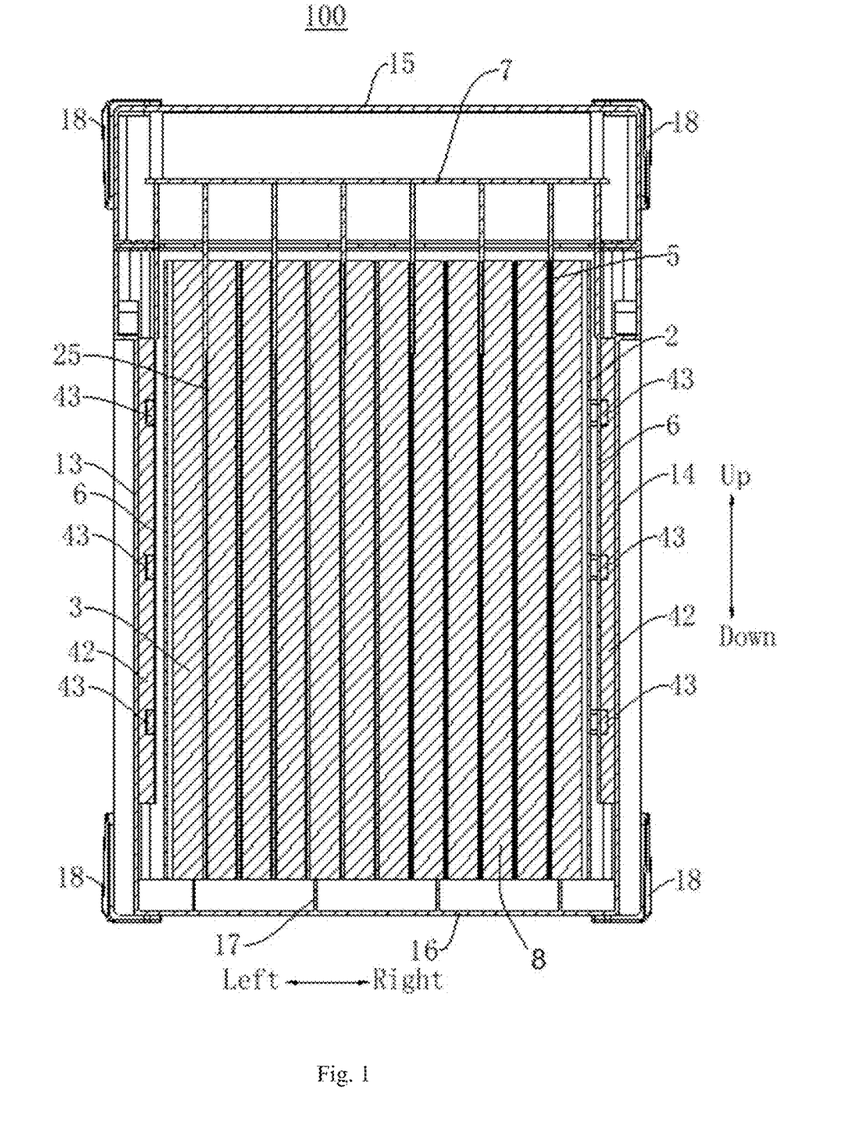
FIG. 1 is a longitudinal sectional view of a battery module according to an embodiment of the present disclosure.
Figure 2:
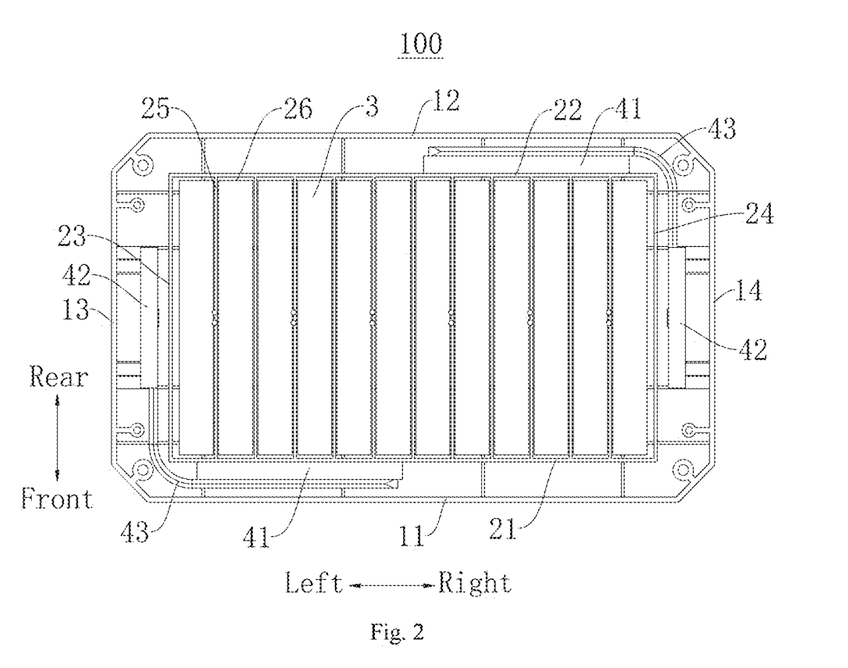
FIG. 2 is a transverse sectional view of a battery module according to an embodiment of the present disclosure.

Referring to FIGS. 1 and 2, the outer housing is a substantially rectangular solid. The outer housing includes a front side plate 11 and a rear side plate 12 spaced apart in a front and rear direction, a left side plate 13 and a right side plate 14 spaced apart in a left and right direction, and a top cover 15 covering a top of the outer housing. The left side plate 13 connects a left end of the front side plate 11 and a left end of the rear side plate 12, and the right side plate 14 connects a right end of the front side plate 11 and a right end of the rear side plate 12, and lower parts of the left side plate 13 and the right side plate 14 are both recessed inwards. A bottom of the outer housing is constructed with a plurality of horizontally arranged first ribs 16, and the first ribs 16 are mutually staggered. The plurality of mutually staggered first ribs 16 is further provided thereon with a plurality of vertically arranged second ribs 17 to enhance the strength of the bottom of the outer housing. Eight corners of the outer housing are respectively provided with "L"-shaped rubber pads 18, and the rubber pads 18 can prevent the outer housing from being subjected to wear or from being subjected to an impact when dropped.

Referring to FIGS. 1-7, the battery body includes the inner casing 2 and a plurality of battery cells 3. The inner casing 2 is formed to be a rectangular solid, and the inner casing 2 includes a first side plate 21 and a second side plate 22 spaced apart along the front and rear direction, a third side plate 23 and a fourth side plate 24 spaced apart along the left and right direction. The third side plate 23 connects a left end of the first side plate 21 and a left end of the second side plate 22. The fourth side plate 24 connects a right end of the first side plate 21 and a right end of the second side plate 22. The first side plate 21 and the second side plate 22 each constitute a side wall of the inner casing 2, and the third side plate 23 and the fourth side plate 24 each constitute an end wall of the inner casing 2. The inner casing 2 is provided with a plurality of partition plates 25 spaced apart along the left and right direction. A front end and a rear end of each partition plate 25 are connected with the first side plate 21 and the second side plate 22 correspondingly. The inner casing 2 and the plurality of partition plate 25 cooperatively define a plurality of accommodating spaces 26 mutually spaced apart, and the plurality of battery cells 3 is disposed in the plurality of the accommodating spaces 26 correspondingly.

Referring to FIGS. 1-6, two groups of heat conduction assemblies 4 are provided, the two groups of the heat conduction assembly 4 are arranged along the circumferential direction of the battery body, and each group of the heat conduction assembly 4 includes a first heat conduction member 41, a second heat conduction member 42 and a heat pipe 43 that connected with one another in the heat conduction manner. The first heat conduction member 41 is connected to the side wall of the inner casing 2 in the heat conduction manner, and the first heat conduction member 41 is in a shape of a flat plate. The second heat conduction member 42 is adjacent to the end wall, the second heat conduction member 42 is connected with the outer housing in the heat conduction manner, and the second heat conduction member 42 is in the shape of the flat plate.

With continued reference to FIGS. 3-6, each group of the heat conduction assembly 4 includes three heat pipes 43, and each of the heat pipes 43 includes a first end and a second end bendably connected to the first end. The first end of the heat pipe 43 is connected with the first heat conduction member 41, and the second end of the heat pipe 43 is connected with the second heat conduction member 42. The second heat conduction member 42 is provided with a groove 421, and the second end of the heat pipe 43 is fitted into the groove 421, so that a heat exchange area of the heat pipe 43 and the second heat conduction member 42 can be increased. The three heat pipes 43 are spaced apart in the up and down direction, and the first end of each heat pipe 43 extends along a length direction of the first heat conduction member 41 ("the length direction of the first heat conduction member 41" refers to a direction of the first heat conduction member 41 extending in a circumferential direction of the inner casing 2), and the second end of each heat pipe 43 extends along a length direction of the second heat conduction member 42 ("the length direction of the second heat conduction member 42" refers to a direction of the second heat conduction member 42 extending along the circumferential direction of the inner casing 2).

Figure 3:
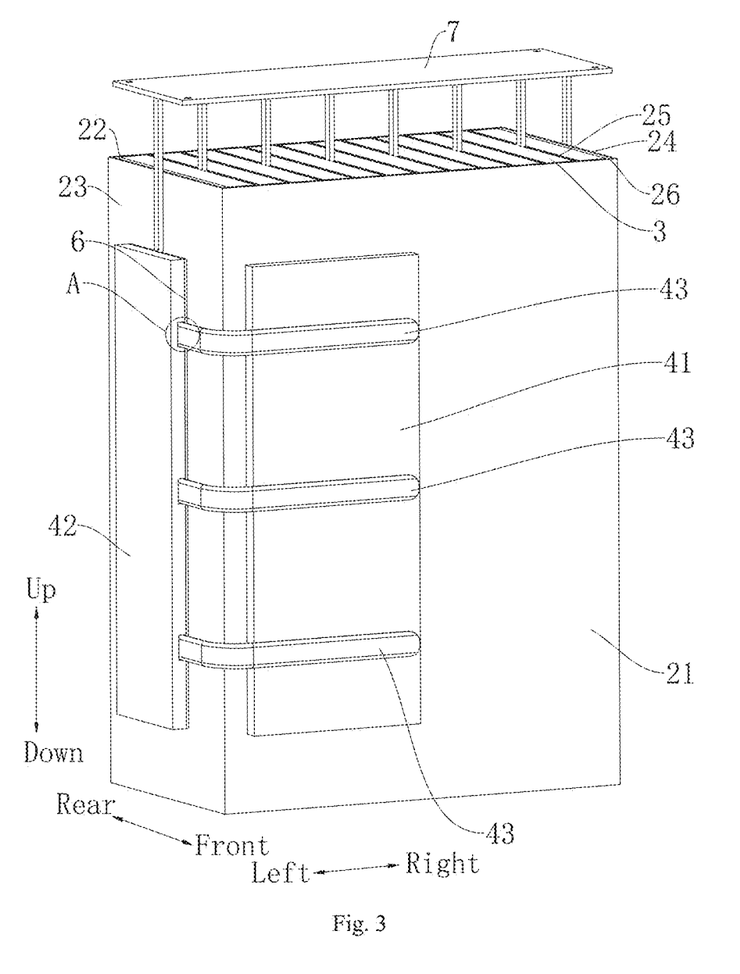
FIG. 3 is a partial schematic view of a battery module according to an embodiment of the present disclosure.
Figure 4:
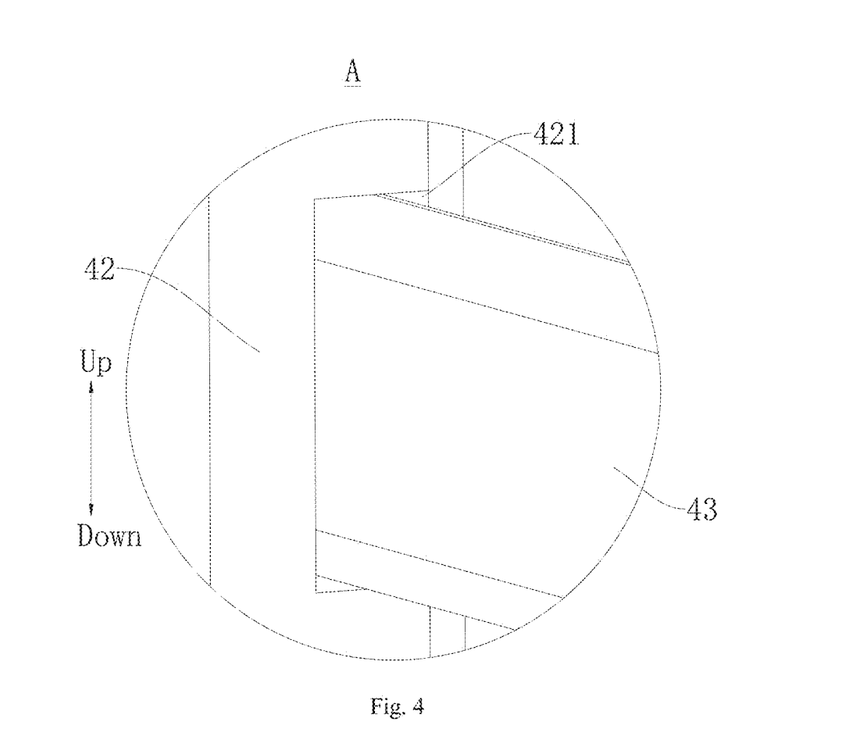
FIG. 4 is an enlarged view of portion A in FIG. 3.
Figure 6:
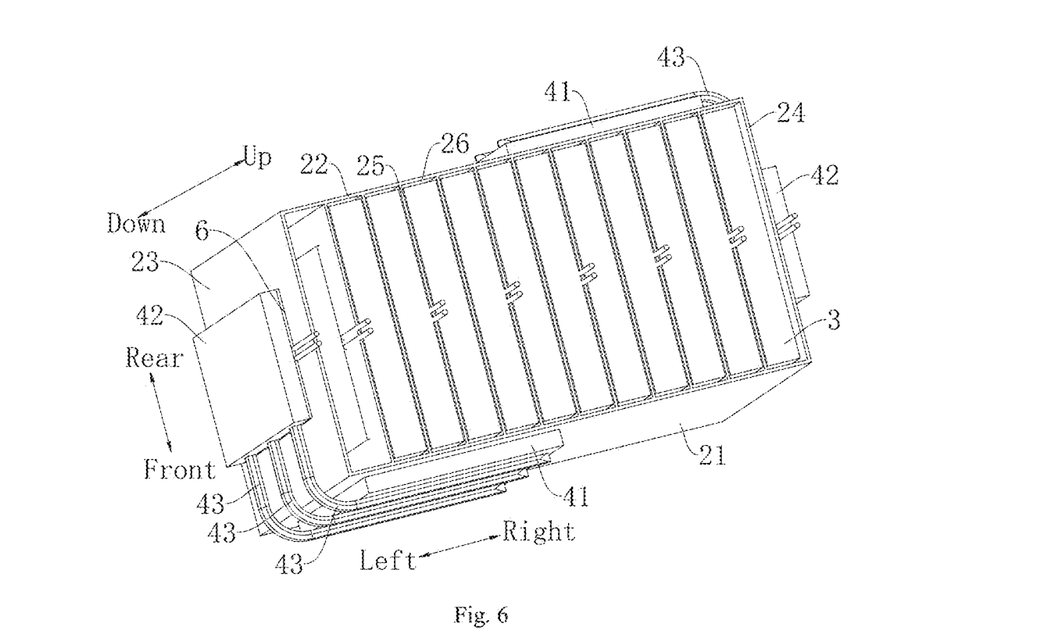
FIG. 6 is an assembly view of a battery body and a heat conduction assembly of a battery module according to an embodiment of the present disclosure in another perspective.

Referring to FIGS. 1, 3 and 6, the first heating member 5 is a heating plate or a heating film, and a plurality of first heating members 5 is provided. The second heating member 6 is a heating plate or a heating film, and two second heating members 6 are provided.

The assembly process of the battery module 100 according to an embodiment of the present disclosure is described below with reference to FIGS. 1 to 7.

Figure 5:
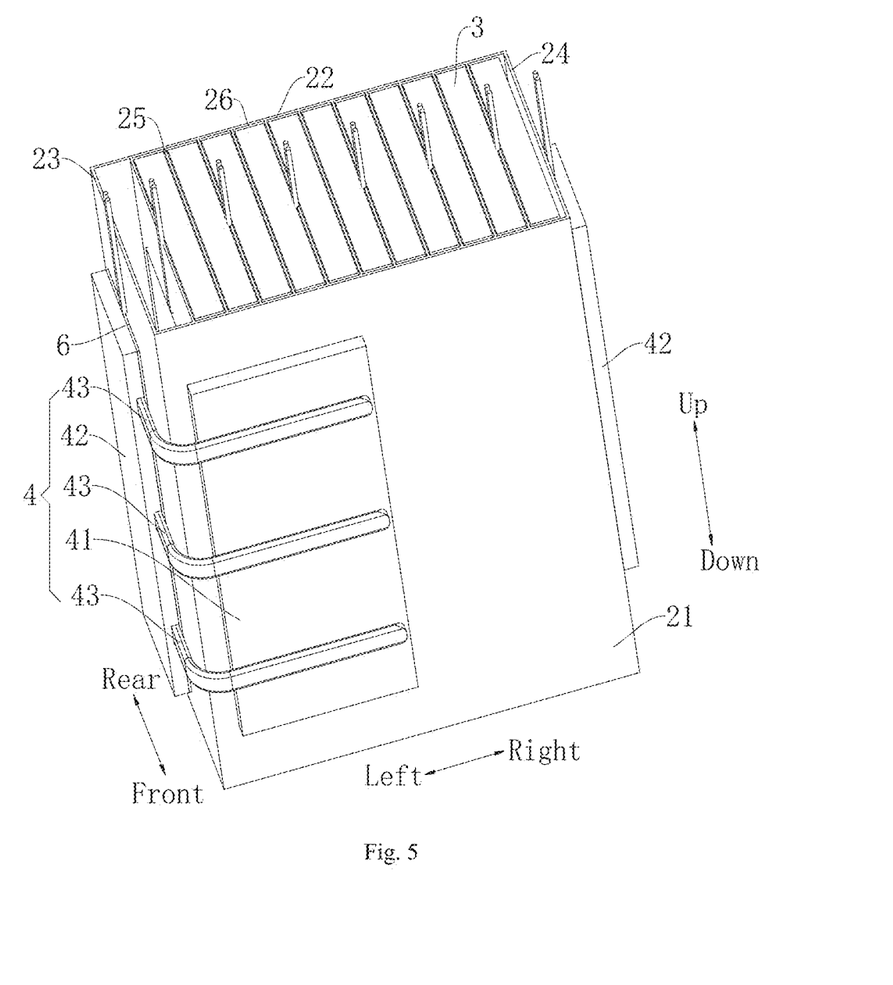
FIG. 5 is an assembly view of a battery body and a heat conduction assembly of a battery module according to an embodiment of the present disclosure.
Figure 7:
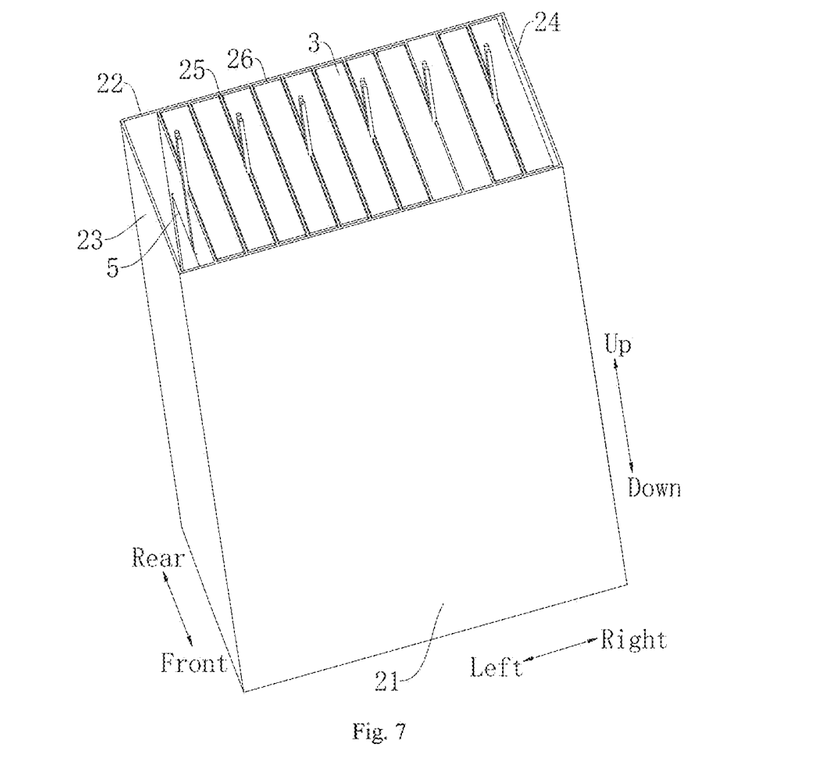
FIG. 7 is a schematic view of a battery body of a battery module according to an embodiment of the present disclosure.

Referring to FIGS. 5-7, the plurality of the first heating members 5 is attached to the left side walls and the right side walls of the plurality of partition plates 25 separately, and the two second heating members 6 are attached to the two second heat conduction members 42 of the two heat conduction assemblies 4 correspondingly.

Referring to FIGS. 3-6, the two groups of the heat conduction assemblies 4 are assembled. The first ends of the three heat pipes 43 in each group of the heat conduction assembly 4 are connected with the first heat conduction member 41, and the second ends of the heat pipes 43 are fitted in the grooves 421 of the second heat conduction members 42. When the two groups of the heat conduction assemblies 4 are assembled, the maximum surfaces of the two first heat conduction members 41 in the two groups of the heat conduction assemblies 4 are attached to the first side plate 21 and the second side plate 22 of the inner casing 2 correspondingly, and the two second heat conduction members 42 in the two groups of the heat conduction assemblies 4 are adjacent to the third side plate 23 and the fourth side plate 24 of the inner casing 2 correspondingly, and a side wall of the second heat conduction member 42 attached with the second heating member 6 is enabled to face the inner casing 2.

Referring to FIGS. 1 and 2, the assembled battery body and the heat conduction assembly 4 are placed in the outer housing, the two second heat conduction members 42 in the two groups of the heat conduction assemblies 4 are attached to an inner wall of the left side plate 13 and an inner wall of the right side plate 14 of the outer housing correspondingly. The plurality of the battery cells 3 is placed in the plurality of accommodating spaces 26 of the inner casing 2 correspondingly.

Referring to FIGS. 1 and 3, the control assembly 7 is placed above the battery body and is electrically connected with the plurality of the first heating member 5, the two second heating members 6, the temperature sensor 8 and the plurality of battery cells 3 separately by means of wire bundles. Finally, the top cover 15 is covered on the top of the outer housing, and the assembly of the battery module 100 is finished.

The beneficial effects of the present disclosure:

1) with the first temperature member 5, the second heating member 6 and the heat conduction assembly 4 provided as well as the temperature sensor 8 and the control assembly 7 provided, the battery module 100 in the low-temperature environment can be rapidly preheated and then be charged and discharged, ensuring that the battery module 100 can be normally charged and discharged in the low-temperature environment and that the charge and discharge performance of the battery module 100 can be improved; meanwhile, the heat generated by the battery body can be dissipated effectively, quickly and promptly by transferring the heat generated by the battery body to the outer housing by means of the heat conduction assembly 4 when the battery module 100 is in the high-temperature environment, so that the heat generated by the battery body can be rapidly, timely and effectively dissipated, and then the service life, the use stability and the safety property of the battery module 100 can be improved.

2) The first heat conduction member 41 and the second heat conduction member 42 in the heat conduction assembly 4 are each formed in the shape of the flat plate, which can increase the heat conduction area and improve the heat conduction effect.

3) With the heat pipe 43 provided being connected between the first heat conduction member 41 and the second heat conduction member 42, the principle of the heat pipe 43 can be used for rapid heat conduction and the heat pipe 43 can be recycled.

4) With the first heating member 5 and the second heating member 6 being configured to be the heating film or the heating plate, the heating efficiency and heating uniformity can be improved.

5) By making the heating power of the first heating member 5 less than the heating power of the second heating member 6, when the battery body is heated, it can be guaranteed that the heat can be transferred from the second heating member 6 to the battery body, ensuring the heating efficiency and meanwhile avoiding the energy waste.

In other embodiments, a plurality of groups of heat conduction assemblies 4 is provided, and the plurality of groups of the heat conduction assemblies 4 is spaced apart along the height direction of the battery body.

In other embodiments, each group of the heat conduction assembly 4 can include only one heat pipe 43, and the heat pipe 43 can be formed into a shape of a flat tube.

In other embodiments, the second heating member 6 can be a semiconductor heating sheet (or a semiconductor cooling sheet) attached between the two second heat conduction members 42 of the two heat conduction assemblies 4 and the outer housing, and a direction of the electric current through the semiconductor heating sheet can be changed so that a surface of the semiconductor heating sheet facing the battery body is a heating surface.

A method for controlling charge and discharge of the battery module 100 according to an embodiment of the present disclosure is described below.

The method for controlling charge and discharge of the battery module 100 includes the following blocks.

S01. The control assembly 7 receives the temperature signal sent by the temperature sensor 8, in which the temperature signal is generated by the temperature sensor 8 according to the temperature of the battery body. When the battery body includes the plurality of battery cells 3, the temperature of the battery body is an average temperature of the plurality of battery cells 3.

S02. The control assembly 7 judges a temperature Tx corresponding to the received temperature signal, in which the temperature Tx can represent the temperature of the battery body. When the temperature Tx does not exceed the temperature T0, the control assembly 7 controls the first heating member 5 to heat the battery body, and the control assembly 7 controls the second heating member 6 to heat the heat conduction assembly 4. The temperature T0 is a temperature threshold, which for example, may be 15° C.-20° C.

For example, when the temperature Tx of the battery body detected by the temperature sensor 8 does not exceed the temperature T0, the control assembly 7 can control the first heating member 5 and the second heating member 6 to perform heating, so that the battery body can be quickly preheated, thereby a proper temperature of the battery module 100 before charge and discharge can be guaranteed, and the charge and discharge performance of the battery module 100 is ensured.

In the method for controlling charge and discharge of the battery module 100 according to the embodiment of the present disclosure, the temperature of the battery body is detected by the temperature sensor 8 before the battery module 100 is charged and discharged. When the detected temperature of the battery body doesn't exceed the set temperature threshold, the control assembly 7 controls the first heating member 5 and the second heating member 6 to perform heating, so that the battery body can be preheated in the low-temperature environment. The method for controlling charge and discharge is simple and reliable, which can guarantee that the battery module 100 is normally charged and discharged and can improve the charge and discharge performance of the battery module 100.

In some embodiments of the present disclosure, when the temperature Tx exceeds the temperature T0, the control assembly 7 controls the first heating member 5 not to heat the battery body, and the control assembly 7 controls the second heating member 6 not to heat the heat conduction assembly 4. Thus, the battery body can be prevented from overheating, and the energy waste can be prevented.

For example, in the low-temperature environment, the battery body needs to be preheated. When the battery body is heated to the temperature T0, the battery body can be charged and discharged, and the battery body generates heat during charge and discharge. When the temperature of the battery body is greater than the temperature T0, the control assembly 7 controls the first heating member 5 and the second heating member 6 to stop heating, so that the temperature of the battery body can be maintained in a proper range and the energy waste can be prevented.

For another example, in the high-temperature environment, when the temperature of the battery body is greater than the temperature T0, the battery body does not need to be preheated. In this case, the control assembly 7 controls the first heating member 5 and the second heating member 6 not to perform heating, so that the battery body can be prevented from overheating.

The unmanned aerial vehicle according to embodiments of a third aspect of the present disclosure includes the battery module 100 according to embodiments of the first aspect of the present disclosure, and the battery module 100 can provide power for the unmanned aerial vehicle.

In the unmanned aerial vehicle according to embodiments of the third aspect of the present disclosure, by providing the battery module 100 as described above, the overall performance of the unmanned aerial vehicle can be improved.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine and unite the different embodiments or examples and features in different embodiments or examples described in this specification without conflicting with each other.

Although embodiments of the present disclosure have been illustrated and described, it could be understood that the above-mentioned embodiments are explanatory and cannot be construed to limit the present disclosure, and changes, modifications, alternatives and variation can be made to the above-mentioned embodiments within the scope of the present disclosure by those skilled in the art.

What is claimed is:

1. A battery module, comprising:
a battery body;
an outer housing, the battery body being disposed in the outer housing;
a heat conduction assembly, the heat conduction assembly being connected between the outer housing and the battery body in a heat conduction manner;
a first heating member, the first heating member being connected to the battery body and configured to heat the battery body;
a second heating member, the second heating member being connected to the heat conduction assembly and configured to heat the heat conduction assembly;
a temperature sensor, the temperature sensor being configured to detect a temperature of the battery body and generate a temperature signal according to the detected temperature of the battery body; and
a control assembly, the control assembly being electrically connected to the first heating member, the second heating member and the temperature sensor separately, and being configured to receive the temperature signal and control the first heating member and the second heating member according to the temperature signal;
wherein the heat conduction assembly comprises a first heat conduction member and a second heat conduction member connected with each other in the heat conduction manner, the battery body comprises a side wall and an end wall connected to an end of the side wall, the first heat conduction member is connected to the side wall in the heat conduction manner, the second heat conduction member is adjacent to the end wall, and the second heat conduction member is connected with the outer housing in the heat conduction manner.

2. The battery module according to claim 1, wherein the heat conduction assembly further comprises a heat pipe, the heat pipe comprises a first end and a second end bendably connected to the first end, the first end of the heat pipe is connected with the first heat conduction member, and the second end of the heat pipe is connected with the second heat conduction member.

3. The battery module according to claim 2, wherein a plurality of heat pipes is provided, the plurality of heat pipes is spaced apart, the first end of each heat pipe extends along a length direction of the first heat conduction member, and the second end of each heat pipe extends along a length direction of the second heat conduction member.

4. The battery module according to claim 1, wherein heating power of the first heating member is less than heating power of the second heating member.

5. The battery module according to claim 1, wherein a plurality of groups of the heat conduction assemblies is provided, and the plurality of groups of the heat conduction assemblies is spaced apart along a circumferential direction or a height direction of the battery body.

6. The battery module according to claim 1, wherein the second heating member is a heating plate or a heating film or a semi-conductive heating sheet.

7. The battery module according to claim 1, wherein the battery body comprises an inner casing and a plurality of battery cells, the inner casing comprises the end wall and the side wall, the inner casing defines therein a plurality of accommodating spaces spaced apart, and the plurality of battery cells is disposed in the plurality of accommodating spaces correspondingly.

8. A method for controlling charge and discharge of the battery module of claim 1, the method comprising:
S01: receiving, with the control assembly, the temperature signal sent by the temperature sensor, wherein the temperature signal is generated by the temperature sensor according to the temperature of the battery body;
S02: when a temperature Tx corresponding to the temperature signal does not exceed a temperature T0, controlling, with the control assembly, the first heating member to heat the battery body, and controlling, with the control assembly, the second heating member to heat the heat conduction assembly, wherein the temperature T0 is a temperature threshold.

9. The method according to claim 8, wherein when the temperature Tx exceeds the temperature T0, the control assembly controls the first heating member not to heat the battery body, and the control assembly controls the second heating member not to heat the heat conduction assembly.

10. The method according to claim 8, wherein the temperature T0 is 15° C.-20° C.

11. The method according to claim 9, wherein the temperature T0 is 15° C.-20° C.

12. The method according to claim 8, wherein the heat conduction assembly further comprises a heat pipe, the heat pipe comprises a first end and a second end bendably connected to the first end, the first end of the heat pipe is connected with the first heat conduction member, and the second end of the heat pipe is connected with the second heat conduction member.

13. The method according to claim 12, wherein a plurality of heat pipes is provided, the plurality of heat pipes is spaced apart, the first end of each heat pipe extends along a length direction of the first heat conduction member, and the second end of each heat pipe extends along a length direction of the second heat conduction member.

14. The method according to claim 8, wherein heating power of the first heating member is less than heating power of the second heating member.

15. The method according to claim 8, wherein a plurality of groups of the heat conduction assemblies is provided, and the plurality of groups of the heat conduction assemblies is spaced apart along a circumferential direction or a height direction of the battery body.

16. The method according to claim 8, wherein the second heating member is a heating plate or a heating film or a semi-conductive heating sheet.

17. The method according to claim 8, wherein the battery body comprises an inner casing and a plurality of battery cells, the inner casing comprises the end wall and the side wall, the inner casing defines therein a plurality of accommodating spaces spaced apart, and the plurality of battery cells is disposed in the plurality of accommodating spaces correspondingly.

* * * * *